UNITED STATES PATENT OFFICE.

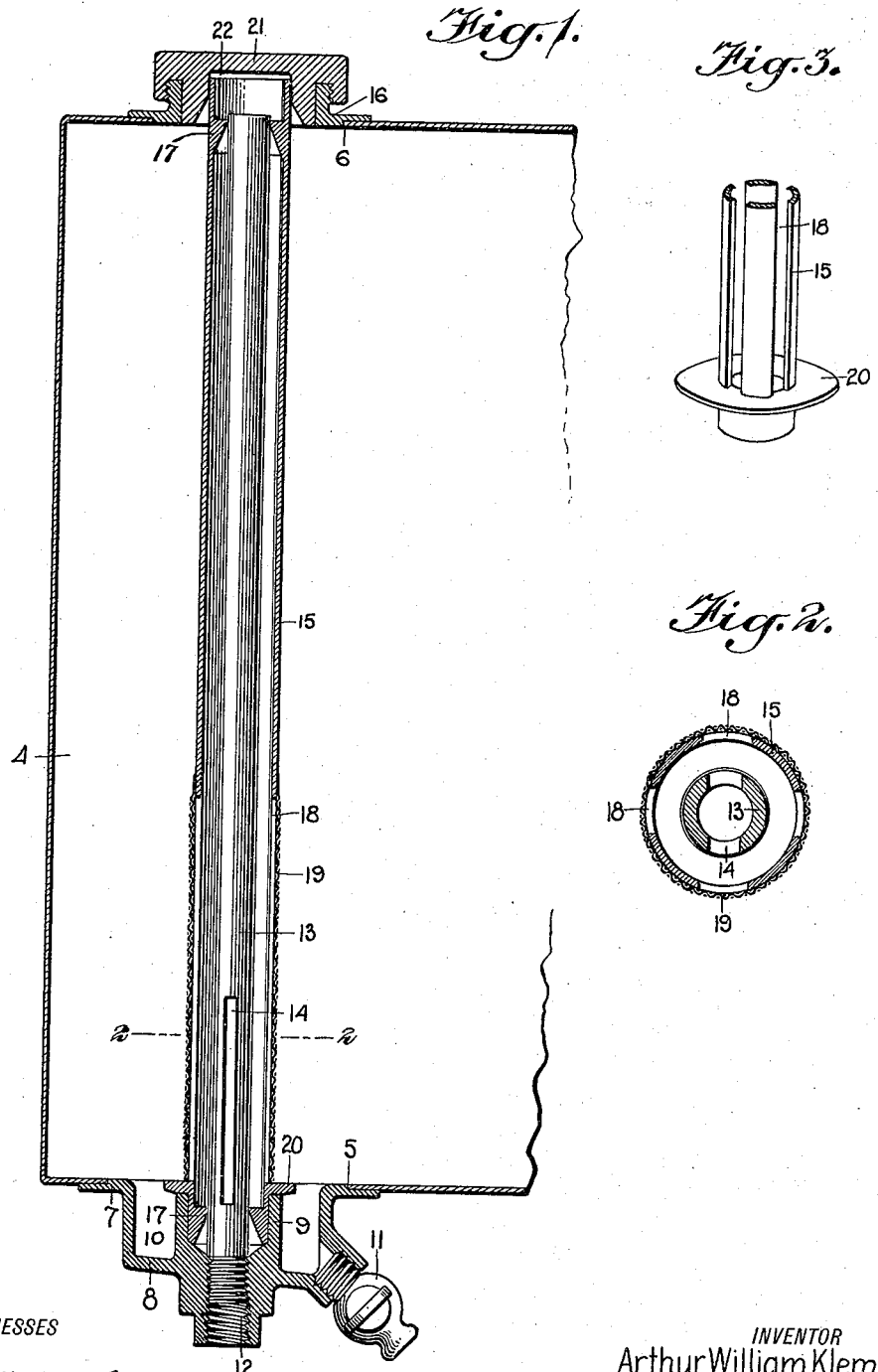

ARTHUR WILLIAM KLEMT, OF NEW YORK, N. Y.

LIQUID-STRAINER.

1,156,785.  Specification of Letters Patent.  Patented Oct. 12, 1915.

Application filed January 25, 1915. Serial No. 4,203.

*To all whom it may concern:*

Be it known that I, ARTHUR WILLIAM KLEMT, a citizen of the United States, and a resident of the city of New York, borough of Bronx, in the county of Bronx and State of New York, have invented a new and Improved Liquid-Strainer, of which the following is a full, clear, and exact description.

My invention relates to strainers for liquids, and has reference more particularly to strainers for gasolene tanks of automobiles.

The object of the invention is to provide a simple, convenient, strong, and inexpensive strainer which is removable from the tank through the top thereof and which strainer is associated with a cup located at the bottom of the tank and which cup forms a water-trap.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a section through a tank provided with a strainer embodying my invention; Fig. 2 is a horizontal cross section through the strainer on line 2—2; Fig. 3 is a fragmentary perspective view of the lower portion of the strainer tube.

In liquid strainers at present in use in connection with gasolene tanks, it is very often necessary to empty the tank before the strainer can be removed and cleaned; and very often the structure of the strainer is such that the same cannot be removed on the road and it is necessary to bring the automobile into a garage where the strainer can be removed from the tank and cleaned. The purpose of my invention is to obviate this defect by providing a liquid strainer for gasolene tanks of automobiles which can be easily and quickly removed at any desired time without the necessity of emptying the tank of its contents.

Referring to the drawings, the tank 4 is provided with alining apertures 5 and 6 in the bottom and top of the tank respectively. The bottom opening 5 is engaged by the projecting portion of a flange 7 of a cup 8 depending from the bottom of the tank. The flange 7 can be secured to the bottom of the tank by any suitable means; preferably the same is welded thereto. The cup 8 is provided with a central socket 9 whereby an annular chamber 10 is formed in the cup. This annular chamber forms the water-trap and also the trap for any sediment that may find its way into the said annular chamber 10. A pet cock 11 controls the outlet from the annular chamber 10.

The socket portion of the cup has a reduced threaded opening 12 which forms the liquid outlet and which, in gasolene tanks, will be connected to the tube leading to the carbureter. Engaging said threaded opening 12 and projecting above the cup is the outlet tube 13 which has slots 14 on its lateral surface located adjacent the cup and wherethrough the liquid is admitted to the outlet opening 12. The outlet tube 13 preferably extends to the top of the tank and serves as a guide for the strainer tube 15, the lower end of which tube is made to fit snugly into the socket 9 while the upper end is substantially level with the upper surface of a union member 16 fitting into the opening 6 of the tube of the tank and secured thereto in any suitable way. The strainer tube 15 is provided with slots or openings 18 which are screened by a gauze fabric 19 and, therefore, form the strainer for the liquid passing through the openings 18 toward the slots 14 in the outlet tube 13. The strainer tube 15 is provided with internal projections 17, located at the lower end and adjacent the upper end thereof, which maintain the strainer tube 15 concentric with the outlet tube 13 and cause the engagement of the lower end of the strainer tube 15 with the socket 9 when said strainer tube is moved into position through the top of the tank 4.

The strainer tube 15 is preferably provided with a flange or collar 20 at the lower end of the openings 18. The purpose of the said flange is to prevent any material adhering to the gauze fabric 19 from sliding off therefrom and falling into the socket 9 or water-trap 10 while the strainer tube 15 is removed. The opening in the union member 16 is slightly larger than the diameter of the flange or collar 20, so that the strainer tube with the collar can be easily removed through the union when necessary. The union 16 is provided with a cap 21 which has a socket portion 22 adapted to engage the end of the strainer tube 15 and prevent any lateral movement of the same when the tank 4 is in movement. By the engagement of the cap 21 with the strainer tube 15 the strain on the strainer tube 15 is also relieved, as can easily be seen from the drawings.

When it is desired to clean my strainer, the cup 21 is removed from the union 16. The upper end of the strainer tube 15 is then grasped, and by pulling the same the lower end thereof will be disengaged from the socket 9 and the strainer tube 15 can then be pulled out from the top of the tank. Any dirt or sediment that may tend to slide off the gauze fabric 19 will be received and retained by the collar 20 and, consequently, removed with the removal of the strainer tube 15. After cleaning the gauze fabric of the strainer, the same is replaced by simply causing it to slide over the outlet tube 13 and replacing the cap 21. The cleaning of the strainer is a simple manipulation which does not require any special instrument nor the emptying of the contents of the tank.

While I have described the principle of operation, together with the device which I now consider to be the best embodiment thereof, I desire to have it understood that the device shown is merely illustrative and that such changes may be made as are within the scope of the appended claims.

Having thus described my invention, I claim as new and desire to secure by Letters Patent:

1. In combination with a liquid tank, a strainer at the bottom thereof extending toward the top of the tank and removable from said tank through the top, and means engaging and locking said strainer in the tank to the top.

2. In combination with a liquid tank, a water-trap at the bottom thereof, and a strainer within the tank associated with the trap and removable therefrom through the top of the tank and means detachably engaging the top and the strainer.

3. In combination with a liquid tank, a water-trap positioned at the bottom thereof, an outlet tube associated with said trap and projecting into the tank, a tubular strainer surrounding said outlet tube and removably engaging said trap, said tubular strainer projecting through the top of the tank, and means for locking said projecting end substantially as and for the purpose set forth.

4. In combination with a liquid tank having alining openings in the bottom and top thereof, a cup engaging the bottom opening and forming a water-trap, said cup having an outlet tube projecting into the tank, a tubular strainer surrounding said outlet tube and engaging the cup, said tubular strainer projecting through the top opening of the tank, and means associated with the top opening whereby the tubular strainer is locked in the tank.

5. In combination with a liquid tank having alining openings in the bottom and top thereof, a cup engaging the bottom opening and forming a water-trap, said cup having a central socket, an outer tube within said socket projecting into the tank, a tubular strainer surrounding said outlet tube and removably engaging the socket, said tubular strainer projecting through the top opening of the tank, said tubular strainer having means whereby the outlet tube forms a guide for said tubular strainer, and means associated with the top opening whereby the tubular strainer is locked in the tank.

6. In combination with a liquid tank having alining openings in the bottom and top thereof, a cup engaging the bottom opening and forming a water-trap, said cup having a central socket, an outlet tube within the socket projecting into the tank substantially to the top thereof, a tubular strainer surrounding said outlet tube and removably engaging the socket, said tubular strainer having means adapted to engage the outlet tube whereby the tubular strainer is guided by said outlet tube into and out of engagement with the socket, said tubular strainer projecting through the top opening of the tank, a cap for closing the top opening adapted to engage the end of the strainer tube whereby said strainer tube is locked in the tank.

7. In combination with a liquid tank having alining openings in the bottom and top thereof, a cup engaging the bottom opening and forming a water-trap, a strainer within the tank associated with the trap and removable therefrom through the top of the tank, said cup having an outlet tube extending within the strainer and forming a guide therefor, and means for closing the top opening of the tank adapted to lock the strainer within the tank.

8. In combination with a liquid tank, a water-trap positioned at the bottom thereof, an outlet tube associated with said trap and projecting into the tank, a tubular strainer surrounding said outlet tube and removably engaging said trap, said tubular strainer projecting through the top of the tank and having a flange or collar adjacent the water-trap with which it is removable through the top opening, and means for locking said projecting end of the tubular strainer to the tank at the opening.

In testimony whereof I have signed my name to this specification in the presence of two subscribing witnesses.

ARTHUR WILLIAM KLEMT.

Witnesses:
 WARREN PARSONS,
 GUY A. WARD, Jr.

Copies of this patent may be obtained for five cents each, by addressing the "Commissioner of Patents Washington, D. C."